Feb. 24, 1953

A. K. VELAN 2,629,553

UNIVERSAL STEAM TRAP

Filed Feb. 23, 1951

Inventor
Adolf K. Velan

By Alan Swabey
Attorney

Feb. 24, 1953 A. K. VELAN 2,629,553
UNIVERSAL STEAM TRAP
Filed Feb. 23, 1951 2 SHEETS—SHEET 2

Inventor
Adolf K. Velan
By Alan Swabey
Attorney

Patented Feb. 24, 1953

2,629,553

UNITED STATES PATENT OFFICE 2,629,553

UNIVERSAL STEAM TRAP

Adolf Karel Velan, Montreal, Quebec, Canada

Application February 23, 1951, Serial No. 212,333

7 Claims. (Cl. 236—59)

1

*Introduction*

The present invention relates to an improvement of devices for controlling the air venting and condensate draining of steam using equipment working on bi-metallic or bellows thermostatic principle.

In heating installations, for example those used in processing industries, heating plants, and the like, where saturated steam or superheated steam is employed as the heating medium, it is necessary to provide various automatic devices so that the air will be discharged from the systems during the initial heating up from cold condition, condensed steam must be discharged from the system without the loss of live steam, and the back flow of condensate prevented. Normally, separate devices are used for each operation, for example, steam traps are provided for the automatic discharge of condensed steam, air vents of various types and designs are used for the automatic discharge of air from the systems during the heating up period, and check valves of various types and descriptions are installed in front of the discharging side of the steam traps to prevent possible back flow of condensate from return lines of adjoining equipment. In some installations, temperature control valves are installed on the discharging side of the steam traps in order to hold up hot condensate under pressure in the system, and to allow the discharge of condensate having a predetermined lower temperature.

Further, strainers of various types and descriptions are usually installed in front of the steam traps to protect the traps from dirt, scale, or other foreign matters and control glasses are often installed, mainly on the discharge side of the steam trap, to allow an attendant to observe and visually check the condensate in order to detect possible tracings of foreign matter or corrosive fluid. In other systems, separate temperature gauges are also employed to determine the temperature of the incoming steam and condensate leaving the trap.

These devices are all necessary to meet the requirements of an efficient steam installation as well as separate valves and valve seats to control the steam traps, air vents, and check valves. Further, most steam traps at present available can be installed only in one position so that it is necessary to employ various types and sizes to accommodate varying pressures and load conditions.

The present invention recognizes the disadvantages of prior art apparatus of this nature

2 and aims to provide a single controlling device that combines the function of all the previous required elements, namely, steam trap, air vent, check valve, control glass, strainer, and temperature control valve. This device by the action of a single pressure and temperature responsive free floating valve and associated valve seat is adapted to control the venting of air, the discharge of condensate and the back flow of condensate. Additional means embodied in a preferred construction of the device provide a visual check of the condition of the condensate and the temperature of condensate discharge. Further, the present device has been designed so that position has no effect on operation enabling it to be installed in any position.

Accordingly, the invention is embodied in a steam trap having a main body including an internal recess constituting a fluid chamber with openings provided in the body so as to constitute inlet and discharge openings leading to the chamber. A heat and pressure responsive member is mounted in the chamber between the inlet and outlet passages and is adapted to engage and actuate the free floating valve member under predetermined conditions of heat and pressure. The valve member is mounted within the chamber so as to be capable of free longitudinal and rotary movement axially of the outlet passage and includes an outstanding bulbous head which is positioned exteriorly of the chamber. The valve head is adapted to effect a closure of the outlet passage in one terminal position of the valve member as actuated through the heat and pressure responsive member.

More specifically, the heat and pressure responsive member is a bimetallic element constructed so that its deflection follows a curve substantially equal to the normal saturated steam curve between temperature and pressure. This construction allows the element to accommodate a large pressure and temperature range.

In the preferred construction, the bimetallic element comprises of a plurality of spaced apart segments, each segment being of graduated strength and being mounted within the chamber so that each segment will act in co-ordinated sequence in accordance with the rise of steam temperature and pressure. This construction gives an element of greater sensitivity than was previously possible.

A further feature of the present invention resides in the manner wherein the valve member is mounted for free floating movement axially of the outlet passage from the chamber. This is accomplished by having the stem of the valve mounted for longitudinal and rotary movement in a supporting bridge pivotally secured to the first segment of the bimetallic element.

As the bimetallic element is secured within the chamber a predetermined distance from the outlet passage, the amount of clearance between the outstanding closure head of the valve member, and the outer face of the outlet passage constituting the valve seat can be adjusted by means of an adjusting nut threadably engaged with the inner end of the valve member and acting against the supporting bridge. Means are also provided whereby the adjustment of the valve closure head can be accomplished by rotation of an adjustable member positioned externally of the casing body.

In a preferred construction, an opening is provided in the upper portion of the chamber and a control glass is inset in this opening and retained by a threaded cover so as to allow for visual inspection of the condensate within the main chamber. A removable strainer is provided between the inlet passage in the main chamber and a bimetallic element temperature gauge is inserted adjacent the outer end of the outlet passage so as to provide a temperature check on fluid leaving the chamber.

Having thus generally described the nature of the invention, particular reference will be made to the accompanying drawings showing by way of illustration a preferred embodiment of the device, and in which—

Figure 1:
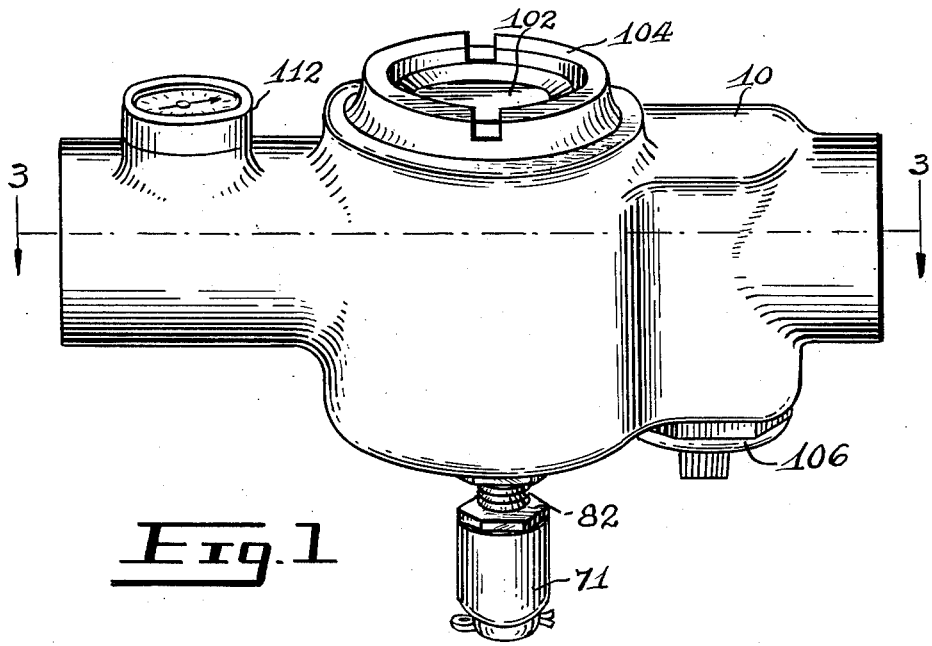
Figure 1 is a side view in perspective elevation of a preferred construction of a steam trap in accordance with the invention.
Figure 2:
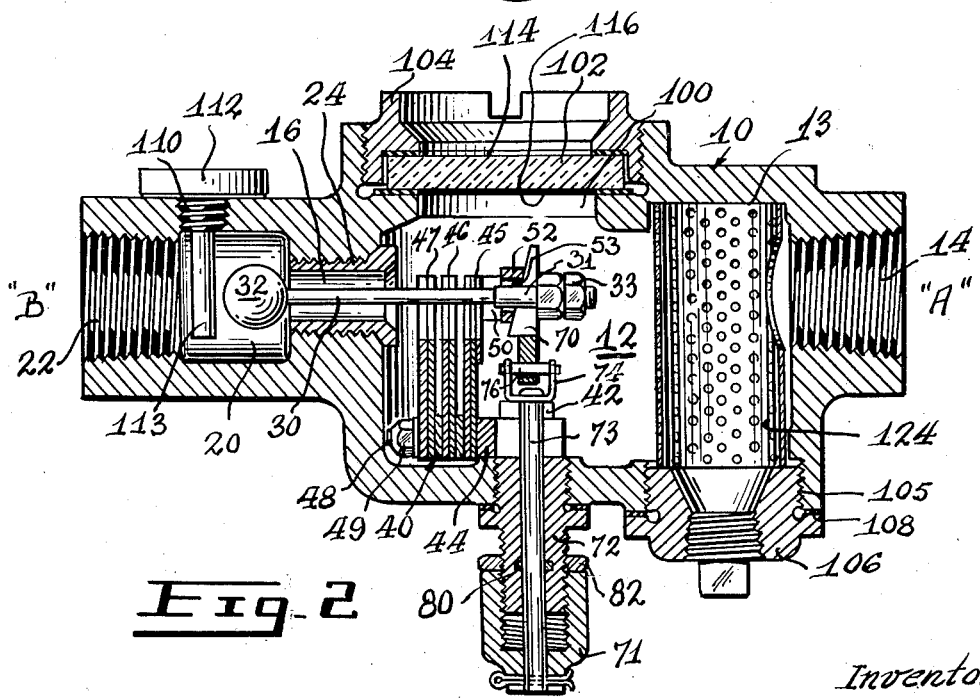
Figure 2 is a vertical cross section of the construction shown in Figure 1 to illustrate the construction and disposition of the internal members more clearly.
Figure 3:
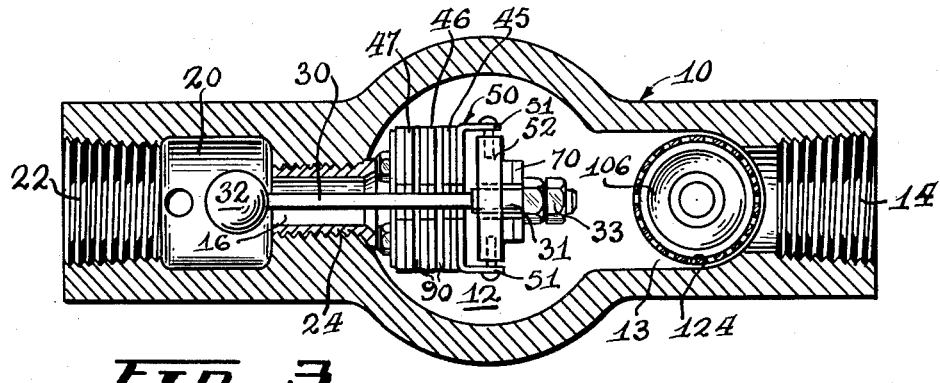
Figure 3 is a sectional view in plan of Figure 1 along the line 3—3.

With particular reference to Figures 1 and 2 of the drawing, a universal steam trap constructed in accordance with the present invention is shown as comprising of a main outer body 10 having an internal recess constituting a fluid chamber 12, and opposed borings constituting inlet 14 and outlet 16 passages. The outlet passage 16 leads into an intermediate enlargement 20 and is continued by a tapped opening 22 providing means of connection to the piping of a heating system. The inlet passage 14 is also tapped to allow for interconnection.

The outlet passage 16 is tapped and a threaded valve seat 24 is mounted in the passage so that the end of the seat extends slightly into the enlargement 20. A valve member having an elongated shank 30 and a bulbous closure head 32 is mounted for free floating movement within the chamber 12 in the following manner. A temperature and pressure responsive bimetallic element 40 is mounted on the lower portion of the chamber 12 by means of screws 42 engaged in suitable tapped openings provided in the casing body. The bimetallic element 40 consists essentially of a base or holder 44, through which the screws 42 are passed, and a series of bimetallic segments 45, 46, 47 mounted in spaced apart relationship to the base 44 by threaded rods 48 and locking nuts 49. The construction and operation of the element 40 will be discussed in more detail later.

A bridge 50 is secured to the first segment 45 of the element 40, by spot welding or the like, and includes extended flanges 51 between which is pivotally mounted a wedge shaped rocker 52 having a central opening 53. The tail end of the valve member shank or stem 30 is provided with an enlarged end portion 31 which slidably fits through the opening 53 in the rocker 52. The tail end of the valve portion 31 is threaded and locking nuts 33, are provided.

The rocker 52 supporting the valve member has its inner face chamfered at an angle relative to the locking nuts 33 and a pivotally mounted adjusting wedge 70 is provided with a corresponding angular face which is adapted to slidably fit between the rocker 52 and the nuts 33. The adjusting wedge 70 is bifurcate so as to extend on each side of the valve end portion 31 and is pivotally mounted on the end of an elongated rod 73 which extends through a threaded plug 72 to the exterior of the body 10 where it is connected to an adjustable threaded cap 71 fitting over the end of the plug 72. The pivotal connection between the end of the rod 73 and the wedge 70 consists of a U bracket 74 pivotally mounted on the end of the rod with a shaft 76 supported between the arms of the bracket 74 slidably fitting through an opening in the lower portion of the wedge 70.

A sealing ring 80 is preferably provided in the plug 72 to prevent possible escape of fluid between the rod 73 and the interior of the plug, and a locking nut 82 is provided so as to enable the adjusting cap 71 to be locked in any desired position.

With this arrangement, rotation of the adjusting cap 71 on the exterior of the body 10 causes a corresponding raising or lowering of the wedge 70 so as to act against the rocker 52 and thus vary the clearance between the valve closure head 32 and the valve seat 24.

The bimetallic element 40 is constructed so that its deflection follows a curve substantially equal to the saturated steam curve. As it would be extremely difficult, if not impossible to obtain a single bimetallic element having the exact characteristics of the saturated steam curve of pressures and temperatures, the present multi-segment construction was developed so that the temperature responsive element would respond, as nearly as possible to the saturated steam curve. Accordingly, the bimetallic segments 45, 46 and 47 are mounted in spaced apart relationship on the holder 44 so that only the first segment 45 will be in operation from 0–50 p. s. i., that is, from about 70° F. to about 300° F. (see Figure 4).

Figure 6:
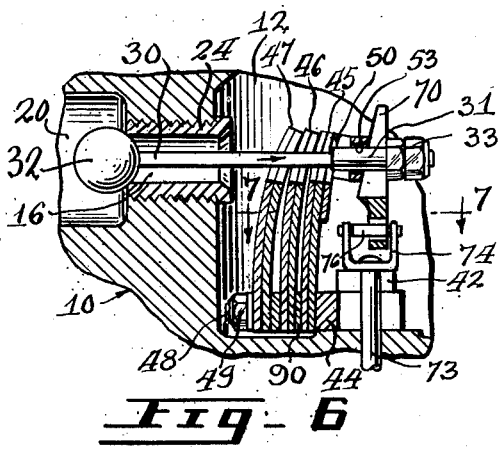
Figure 6 is a fragmentary view corresponding to Figures 4 and 5 illustrating the entire bimetallic element in functional operation as would be actuated by high temperature and pressure conditions.
Figure 7:
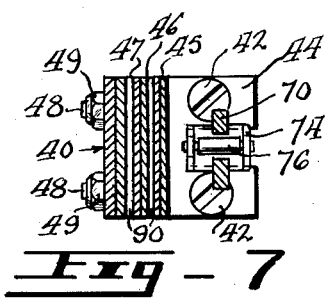
Figure 7 is a plan view partially in section along the line 7—7 of Figure 6 of the preferred bimetallic element to illustrate the construction and means of attachment in more detail.

The second segment 46 comes into operation at about 300° F. and add their ability to add force to the segment 45 over the range of from about 300° F. to about 390° F. for 200 p. s. i. (see Figure 5). At this point the segment 47 comes into operation to add force to the segments 45, 46 for pressures from about 200 p. s. i. up to about 350 p. s. i. (see Figure 6).

It will be understood that while the segments 45, 46, 47 are shown as each comprising one single bimetallic plate comprising two metals having largely different coefficients of thermal expansion and, therefore, tending to change its curvature when subjected to a change of temperature, this is only for the purpose of illustration and that in actual practice each segment comprises of a plurality of bimetallic plates. The number of bimetallic plates in each segment is increased proportionately upwardly from the segment 45 to the segment 47, the exact number of plates in each segment depending on the size and strength of the individual plates and the thermal pull required to keep the valve closed against the steam pressure. This factor, of course, is determined by the area of the outlet passage 16 and the surface acted on of the valve closure head 32.

The construction by which the segments 45, 46, 47 are made to operate in sequence employs a separating metal shim 90 between the base of each plate adjacent the holder 44 with the upper ends of the segments free so that each segment is separated from the other. The thickness of the shims 90 are determined by the free deflection of the bimetallic material employed between temperatures for example, between 212° F. and 300° F., or 300° F. and 390° F.

The casing body 10 also includes a centrally located top opening 100 leading into the chamber 12 and a chemical resistant glass disc 102 is mounted in this opening between asbestos gaskets 114, 116. The disc 100 is retained in position by means of an annular cover 104 threadably engaged in the body opening 100. This provides a control glass whereby a visual check may be made of the fluid within the chamber 12.

The end of the chamber 12 adjacent the inlet passage 14 is reduced to a substantially cylindrical portion 13 wherein a strainer 124 is mounted by known means. As indicated in the drawing, the clearance between the strainer and the adjacent walls of the valve chamber is at least as small as the size of the strainer openings. A tapped opening 105 is provided in the body 10 beneath the chamber portion 13 and a strainer plug 106 is threadably secured in this opening with a copper sealing gasket 108 between the mating faces of the plug 106 and body 10.

A further tapped opening 110 is provided in the body 10 over the enlargement 22 of the outlet passage 16 and a rapid reaction bimetallic thermometer 112 is threadably engaged in this opening so that the temperature sensitive portion 113 is in the path of fluid passing out of the chamber 12.

Function and operation

As will be understood from the foregoing description, the valve member can move freely forward and backward relative to the valve seat 24 and the rocker support 52 provides only a movable support. The movement of the valve member in a direction from A to B, as indicated in Figure 2, is limited by the adjusting nut 33 which is threadably engaged on the valve end 31 and locked in the desired position through the co-operating lock nut. As the bimetallic element 40 is rigidly secured to the body 10 of the trap within the chamber 12, under actuation by the thermal influence of the steam entering the chamber 12 is adapted to deflect in the direction from B to A pulling the valve closure head 32 into contact with the valve seat 24 and thus closing the valve. When cooler condensate enters the chamber 12, the drop in temperature allows the element 40 to deflect in the direction from A to B, allowing the valve member to be forced from the valve seat before the pressure acting on the valve closure head 32 in the direction from A to B.

The clearance in cold state when no steam is in the trap is determined by the position of the adjusting wedge member 70. By turning the adjusting cap 71 clockwise, the member 70 moves upwards diminishing the clearance between the valve head 32 and the valve seat 24 by turning the adjusting cap 71 counter-clockwise, the wedge member moves downward increasing the clearance between the valve head 32 and the valve seat 24.

In operation, and with reference to Figure 2, the trap is shown in a position where the equipment is started up from a cold inoperative condition. There is no steam in the line so that only air and cold water is being pressed out from the lines and equipment by the boiler steam pressure. This pressure acting on the surface of the valve closure head 32 pushes the closure head 32 in the direction from A to B. The valve head 32 moves in this direction until the adjusting nut 33 contacts the wedge member 70; the trap is open and the pressure line connected with the return line. In this condition, the valve member acts as an air vent allowing an initial blast discharge of air and cold water. No separate valve is required, as is necessary in prior art systems, and this operation can be visually checked through the control glass 102 and the temperature check on the gauge 112.

Figures 4, 5:
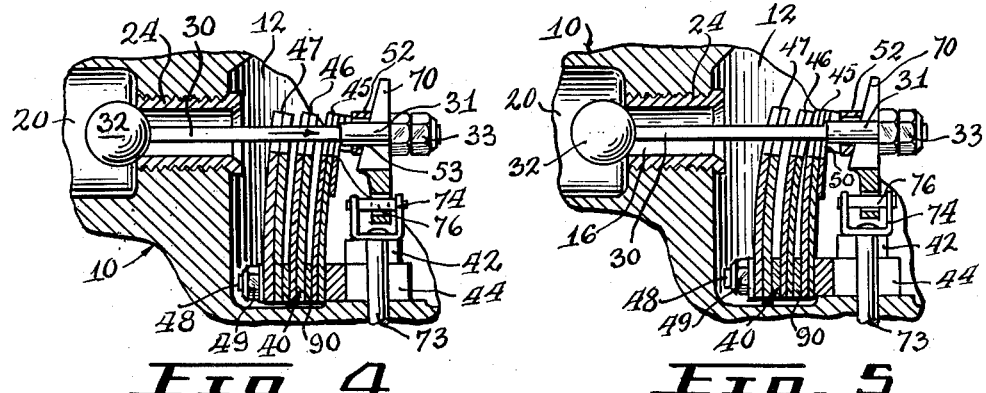
Figure 4 is a fragmentary view of a portion of the construction shown in Figure 2 to diagrammatically illustrate the action of a preferred form of bimetallic element, the position shown being the primary movement under relatively low temperature and pressure conditions.
Figure 5 is a fragmentary view corresponding to Figure 4 to show the action of the element under the influence of increased temperature and pressure.

As the steam enters the trap, the valve is closed by steam temperature. Figure 4 diagrammatically shows the action of the valve and element in this position. The condensate is discharged and steam is in the equipment and in all lines leading to the trap. The incoming steam heats the bimetallic element 40 which causes a deflection of the bimetal and movement from B to A as previously described. This pulls the valve head 32 in the direction from B to A so that the ball surface seats in the end of the seat 24 so that the steam trap is closed and the steam trapped. Again, the incoming steam can be observed through the control glass 102 in order to detect any suspicious colouring and impurities or dangerous corrosive alkali affecting the glass surface. As previously described, the present construction of the heat-sensitive element 40 will continue to operate in a like manner as the pressure and temperature of the steam increase so that a large pressure and temperature range can be accommodated.

When the steam condenses the valve is opened by pressure. In this condition, condensate enters and fills the trap chamber 12. The opening of the valve member is performed in two steps. The first step is performed by a temperature impulse in the following manner. As the temperature of the condensate entering the trap is lower than the steam temperature, the bimetallic element 40 makes a slight movement in the direction from A to B as the valve closure head 32 is free floating and always under pressure. Then released by this reverse movement, the valve head 32 is pressed out from the seat 24 and opens the trap connecting the high pressure side with the return line. Thus, the flow of condensate is released. When this step occurs, we have the following powers acting on the trap. The thermal pull developed by the deflection of the element 40 acts in the direction from B to A keeping the valve closed. The pressure acts on the spherical valve head 32 which has substantially the same surface as the opening of the valve seat 24. This pressure acting on the valve head surface develops a pressure power acting against the thermal pull in the direction A to B when the condensate enters the trap. The bimetallic element 40 is slightly deflected from direction A to B when the thermal pull of the bimetal drops sufficiently so that the above mentioned pressure power overcomes the thermal pull and opens the valve. When the flow of condensate is released and the valve head partially unseated, the pressure acts on the complete inner surface of the valve head 32. This surface has a greater area than that of the valve seat 24 so that more pressure power is applied to the valve head 32 overcoming the gradually weakening thermal pull of the bimetallic element. This increased pressure power pushes the bimetallic element into its original supporting position so that the valve member is allowed to make its complete movement in the direction A to B opening the valve to full capacity.

When the valve is open as described above and the condensate or air discharged, by chance the pressure in the return line side B would be for a moment higher, then the pressure in the inlet side A forcing the condensate from the trap would be stopped and reversed, and the water would flow back into the trap causing damages.

With the present construction, due to its free floating mounting, the valve member will perform a movement in the direction from B to A under the influence of the air pressure from the side B and will keep the trap closed until normal pressure conditions are re-established. In prior equipment, in order to prevent such back flow, special check valves are usually installed.

The present device provides the maximum for temperature control. As mentioned above, the temperature of condensate is always below the steam temperature at equal pressure conditions. In normal steam traps, the condensate is discharged from the trap as soon as it appears in the trap; some types of steam traps will discharge this condensate at temperatures practically as high as the steam temperature. Other designs of traps will discharge this condensate only after the temperature of condensate drops below a certain level.

The present invention provides the means to determine in advance at which temperature of condensate at a certain pressure the steam trap is to open and discharge the condensate. The adjusting cap 71 on the exterior of the trap and acting on the wedge member 70 provides a mechanism allowing for the adjusting of the trap for different discharge temperatures of condensate.

The clearance between valve head 32 and valve seat 24 is determined by the deflection properties of the bimetal used in the element 40. If the trap is adjusted for this highest clearance, the valve will open and discharge condensate at the highest temperature possible, which in the trap illustrated is about from 3 to 4 degrees below steam temperatures. If it is desired that the difference between discharge temperature and condensate and steam temperature should be greater, the clearance between the valve head 32 and the valve seat 24 in the cold state is reduced so that it will take a longer time to decrease the thermal pull of the element 40 to move sufficiently in the direction from A to B so as to release the valve head 32 from the valve seat 24 and open the trap.

A further advantage of the present device is that due to the location of the valve head 34 it is released gradually against the pressure when condensate is discharged. This eliminates the hammering often encountered in prior art pressure steam installations caused by the abrupt opening and closing of valves.

It will be understood that the present steam trap assembly can be installed in any position. The trap can be installed vertically, horizontally, and with the control glass facing upward or downward and this position has no influence whatever on the operation of the trap.

I claim:

1. A steam trap, comprising, a body provided with a fluid chamber, said body also being provided with inlet and outlet passages to the chamber, the outer end of the outlet passage being provided with a valve seat, a valve member having an elongated integral stem extending from a tail end within the chamber to an outstanding closure head beyond the outside end of the outlet passage and adjacent to the valve seat, thermostatic valve-operating means including a bimetallic member and stem-engaging means for movement thereby, said stem-engaging means including a yoke connected to the bimetallic member and a stem-engaging member pivoted to the yoke, said stem-engaging member having an opening extending in the axial direction of the stem receiving the valve stem in a sliding fit, a stop member on the tail end of the stem operatively engageable by said engaging means to retract said stem on actuation of said bimetallic member to move the valve head into closed position, the valve member being free floating to move in either direction solely under fluid pressure when not held closed by said bimetallic member.

2. A steam trap, comprising, a body provided with a fluid chamber, said body also being provided with inlet and outlet passages to the chamber, the outer end of the outlet passage being provided with a valve seat, a valve member having an elongated integral stem extending from a tail end within the chamber to an outstanding closure head beyond the outside end of the outlet passage and adjacent to the valve seat, valve-operating means including a thermostatic member, said thermostatic member comprising a plurality of bimetallic segments, the segments being clamped together at one end only, the unclamped portions of the segments being free for independent movement on activation, a first of said segments operatively linked to the valve stem, said segments all being deflectable by the temperature of saturated steam, the segments being individually spaced whereby initially said first segment acts to close the valve on low pressure-temperature steam while subsequent segments are in inactive position spaced from said first segment, said valve when closed preventing further movement of said first segment while the subsequent segments deflect further through said spacing into operative contact with the first segment developing additional force, the segments in this way acting in sequential order to follow substantially the temperature-pressure curve of saturated steam.

3. A steam trap, comprising, a body provided with a fluid chamber, said body also being provided with inlet and outlet passages to the chamber, the outer end of the outlet passage being provided with a valve seat, a valve member having an elongated integral stem extending from a tail end within the chamber to an outstanding closure head beyond the outside end of the outlet passage and adjacent to the valve seat, valve-operating means including a thermostatic member and stem engaging means for movement thereby, said thermostatic member comprising a plurality of bimetallic segments, the segments being clamped together at one end, the unclamped portions being free for independent movement on activation, said stem engaging means including a yoke connected to a first of said segments and a stem-engaging member pivoted to the yoke, said stem-engaging member having an opening extending in the axial direction of the stem receiving the valve stem in a sliding fit, a stop member on the tail end of the stem operatively engageable by said engaging means to retract said stem on actuation of said bimetallic member to move the valve head into closed position, the valve member being free floating to move in either direction solely under fluid pressure when not held closed by said thermostatic member, said segments all being deflectable by the temperature of saturated steam, the segments being individually spaced whereby initially said first segment acts to close the valve on low-pressure-temperature steam while subsequent segments are in inactive position spaced from said first segment, said valve when closed preventing further movement of said first segment while the subsequent segments deflect further through said spacing into operative contact with the first segment developing additional force, the segments in this way acting in sequential order to follow substantially the temperature-pressure curve of saturated steam.

4. A steam trap comprising, a casing having a main body including an internal recess constituting a fluid chamber, said body being provided with openings, constituting inlet and outlet passages to said chamber, a valve member having an elongated stem and an outstanding closure head said valve member stem extending through said outlet passage and having a maximum cross-sectional dimension sufficiently less than the inside diameter of said outlet passage to provide an annular clearance space therebetween, a bimetallic temperature responsive element mounted in said chamber, the end of said valve member stem remote from said closure head being supported on said bimetallic element for longitudinal and rotary movement axially of said outlet passage between predetermined terminal positions, said valve closure head being disposed exteriorly of said fluid chamber and being normally free for limited movement towards and away from said valve seat under predominant pressure conditions in either direction and adapted to seat on said valve seat in one terminal position of said valve stem, adjustable means between said valve stem inner end and said bimetallic element adapted to vary the extent of said movement between said valve member closure head and said valve seat, said temperature responsive bimetallic element under predetermined conditions of temperature being adapted to urge said valve stem into said terminal position, said adjustable means between said temperature responsive element and said valve stem end comprising, a support member pivotally mounted on said temperature responsive element, said support member including a central opening wherein said valve member stem slidably fits and a tapered surface, an adjustable nut on the inner end of said valve stem, a wedge shaped bifurcate adjusting member between said support member tapered bearing face and said adjustable nut, and means extending exteriorly of said casing whereby said adjusting member may be moved transversely of said valve stem to vary the potential range of movement of said valve closure head relative to said valve seat.

5. A steam trap comprising, a casing having a main body including an internal recess constituting a fluid chamber and a co-extensive substantially cylindrical extension, said casing body being provided with an opening into said chamber extension constituting an inlet passage, said casing body having a further opening constituting an outlet passage, a cylindrical filter screen removably mounted in said extension adjacent said inlet passage, a valve member having an outstanding closure head and a stem extending from said head and being supported in said chamber for longitudinal and rotary movement axially of said outlet passage between predetermined terminal positions, said valve member stem extending through said outlet passage and having a maximum cross-sectional dimension sufficiently less than the inside diameter of said outlet passage to provide an annular clearance space therebetween, an annular valve seat in said passage, said valve closure head being disposed exteriorly of said fluid chamber and being normally free for limited movement towards and away from said valve seat under predominant pressure conditions in either direction and adapted to seat on said valve seat in one terminal position of said valve member, and a temperature responsive member mounted in said fluid chamber adjacent said outlet passage having means adapted to urge said valve member into said terminal position under predetermined temperature conditions, said casing body being provided with a circular tapped recess to constitute an inspection opening to said fluid chamber, said casing body being formed to provide an outstanding annular seat surrounding the lower portion of said recess, a transparent disc mounted on said annular seat so as to mask said inspection opening and an annular retaining member threadably engaged with said recess above said transparent disc so as to retain said disc in sealing contact with said seat.

6. A steam trap comprising, a casing having a main body including an internal recess constituting a fluid chamber and a co-extensive substantially cylindrical extension, said casing body being provided with an opening into said chamber extension constituting an inlet passage, said casing body having a further opening constituting an outlet passage, a cylindrical filter screen removably mounted in said extension adjacent said inlet passage, a valve member having an outstanding closure head and a stem extending from said head and being supported in said chamber for longitudinal and rotary movement axially of said outlet passage between predetermined terminal positions, said valve member stem extending through said outlet passage and having a maximum cross-sectional dimension sufficiently less than the inside diameter of said outlet passage to provide an annular clearance space therebetween, an annular valve seat in said passage, said valve closure head being disposed exteriorly of said fluid chamber and being normally free for limited movement towards and away from said valve seat under predominant pressure conditions in either direction and adapted to seat on said valve seat in one terminal position of said valve member, and a temperature responsive member mounted in said fluid chamber adjacent said outlet passage having means adapted to urge said valve member into said terminal position under predetermined temperature conditions, said opening constituting said outlet passage including an enlargement beyond said valve seat, said casing body including a tapped opening above said passage enlargement and a temperature responsive gauge having a thermally responsive member mounted in said opening so that said thermally responsive member extends into said passage enlargement.

7. A steam trap comprising a casing having a main body including an internal recess constituting a fluid chamber, said body being provided with openings constituting inlet and outlet passages to said chamber, a valve seat in said outlet passage, a valve member having an outstanding closure head and a stem extending from said head, a bimetallic temperature responsive element mounted in said chamber, said bimetallic element comprising a plurality of spaced apart bimetallic segments, each of said segments being of graduated thermally responsive strength relative to an adjacent segment and being connected to each adjacent segment at one end only with the major portion of each segment being free to respond individually under predetermined temperature conditions, said valve member stem being supported for free longitudinal and rotary movement axially of said outlet passage on the weakest of said segments between predetermined terminal positions relative to said chamber outlet passage, said valve closure head being disposed exteriorly of said fluid chamber and being normally free for limited movement towards and away from said valve seat under predetermined pressure conditions in either direction and adapted to seat on said valve seat in one terminal position of said valve member, a support member pivotally mounted on the said weakest segment of said bimetallic element, said support member including a central opening wherein said valve member stem slidably fits and a tapered surface, an adjustable nut on the inner end of the said valve stem, a wedge shaped bifurcate adjusting member between said support member tapered bearing face and said adjustable nut, and means extending exteriorly of said casing whereby said adjustment member may be moved transversely of said valve stem to vary the extent of movement of said closure head relative to said valve seat.

ADOLF KAREL VELAN.

REFERENCES CITED

The following references are of record in the file of this patent:

UNITED STATES PATENTS

| Number | Name | Date |
|---|---|---|
| 221,978 | Sanderson | Nov. 25, 1879 |
| 313,271 | Magoon | May 19, 1885 |
| 1,156,505 | Stern | Oct. 12, 1915 |
| 1,204,265 | Freeman | Nov. 7, 1916 |
| 1,231,044 | Mayer | June 26, 1917 |
| 2,235,651 | Slezak | Mar. 18, 1941 |
| 2,421,144 | Donnelly | May 27, 1947 |
| 2,455,305 | Heva | Nov. 30, 1948 |

FOREIGN PATENTS

| Number | Country | Date |
|---|---|---|
| 225,727 | Switzerland | Feb. 15, 1943 |
| 506,318 | Great Britain | May 25, 1939 |